United States Patent
Hines et al.

(10) Patent No.: US 9,123,260 B2
(45) Date of Patent: Sep. 1, 2015

(54) RECEIVER OPERATING CHARACTERISTIC-BASED TRAINING

(75) Inventors: Horace Hines, San Jose, CA (US); Lingxiong Shao, Saratoga, CA (US); Zuo Zhao, Palo Alto, CA (US); Xiyun Song, Santa Clara, CA (US)

(73) Assignee: Koninklijke Philips N.V., Eindhoven (NL)

( * ) Notice: Subject to any disclaimer, the term of this patent is extended or adjusted under 35 U.S.C. 154(b) by 768 days.

(21) Appl. No.: 12/675,414

(22) PCT Filed: Aug. 26, 2008

(86) PCT No.: PCT/IB2008/053428
§ 371 (c)(1), (2), (4) Date: Feb. 26, 2010

(87) PCT Pub. No.: WO2009/031072
PCT Pub. Date: Mar. 12, 2009

(65) Prior Publication Data
US 2010/0311034 A1    Dec. 9, 2010

Related U.S. Application Data

(60) Provisional application No. 60/969,705, filed on Sep. 4, 2007.

(51) Int. Cl.
  *G09B 23/28*    (2006.01)
(52) U.S. Cl.
  CPC .................................. *G09B 23/286* (2013.01)

(58) Field of Classification Search
  CPC .......................................................... G09B 7/00
  USPC ......................................... 434/322, 323, 362
  See application file for complete search history.

(56) References Cited

U.S. PATENT DOCUMENTS

| | | |
|---|---|---|
| 5,061,187 A | 10/1991 | Jerath |
| 5,463,548 A | 10/1995 | Asada et al. |
| 5,622,171 A | 4/1997 | Asada et al. |
| 6,058,322 A | 5/2000 | Nishikawa et al. |
| 6,546,230 B1 | 4/2003 | Allison |
| 6,669,482 B1 | 12/2003 | Shile |
| 7,088,849 B1 * | 8/2006 | Toth .............................. 382/128 |
| 2005/0010445 A1 | 1/2005 | Krishnan et al. |

FOREIGN PATENT DOCUMENTS

DE    10254938 A1    6/2004

OTHER PUBLICATIONS

Berwick, et al., Receiver Operating Characteristic Analysis of Diagnostic Skill, Medical Care, Sep. 1983, pp. 876-885, vol. 21, No. 9, first page of article and abstract attached.

(Continued)

*Primary Examiner* — Kesha Frisby

(57) ABSTRACT

A presentation component (118) presents information from one or more data source(s) (102) to an assessor for assessment. A receiver operating characteristic (ROC) analyzer 120 uses an ROC analysis technique to evaluate the performance of the assessor. A feedback component (126) provides feedback as to the assessor's performance. A data manipulator (114) facilitates manipulation of the presented data.

20 Claims, 3 Drawing Sheets

(56) References Cited

OTHER PUBLICATIONS

Figure 1:
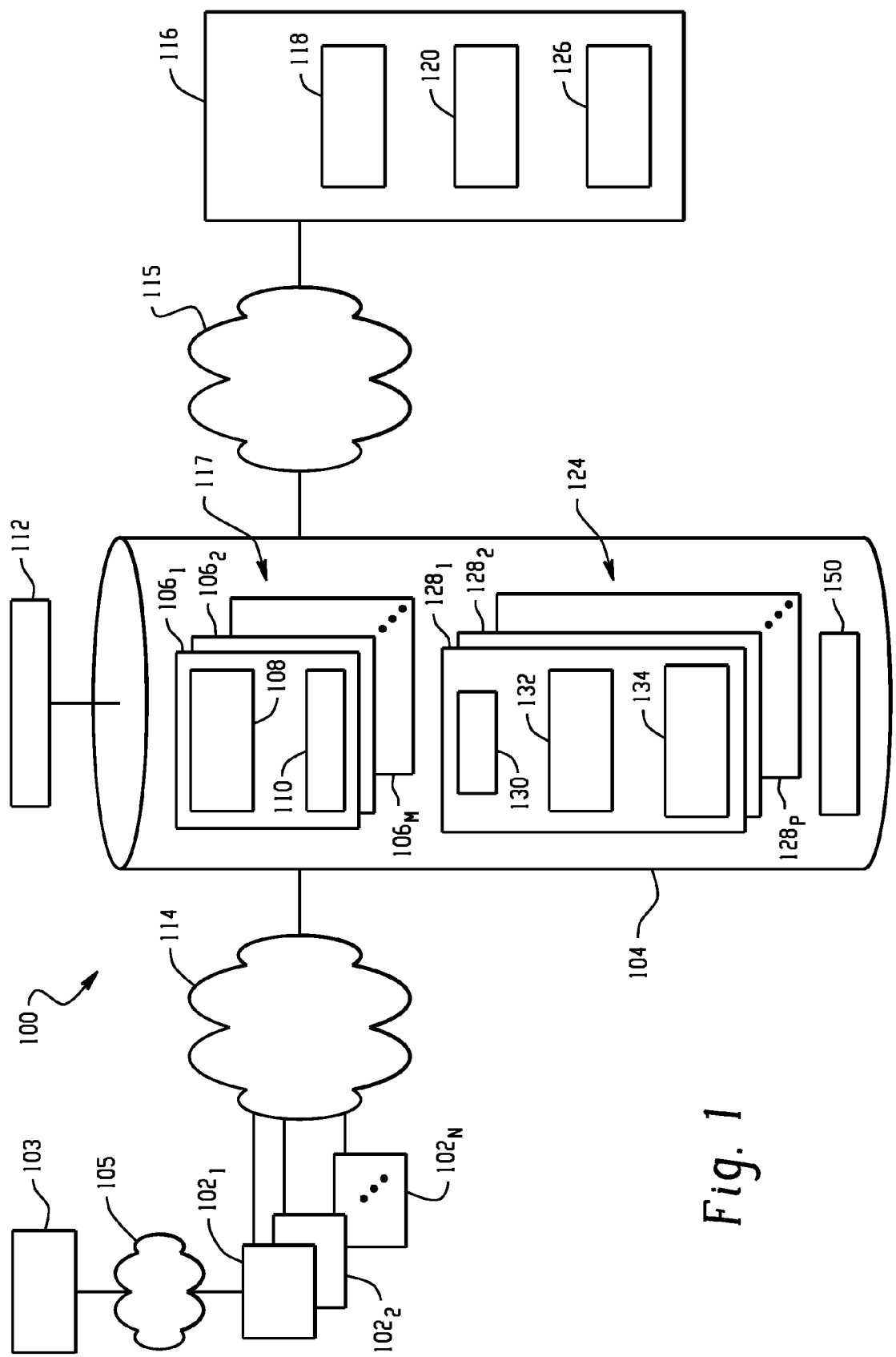

Llacer, et al., Results of a Clinical Receiver Operating Characteristic Study Comparing Filtered Backprojection and Maximum Likelihood Estimator Images in FDG PET Studies, The Journal of Nuclear Medicine, Jul. 1993, pp. 1198-1203, vol. 34, No. 7.

Steven Simon, ROC curve, Children's Mercy STATS, Aug. 18, 1999, 10 pages, http://www.childrensmercy.org/stats/ask/roc.asp.

Farquhar, et al., ROC and Localization ROC Analysis of Lesion Detection in Whole-Body FDG PET: Effects of Acquisition Mode, Attenuation Correction and Reconstruction Algorithm, Lesion Detection in Lung Cancer, The Journal of Nuclear Medicine, Dec. 1999, pp. 2043-2052, vol. 40, No. 12.

Lena Kallin Westin, Receiver operating characteristic (ROC) analysis, Evaluating discriminance effects among decision support systems, 2001, 28 pages, Department of Computing Science Umea University, Umea Sweden.

Narayana, et al., Human-Observer Receiver-Operating-Characteristic Evaluation of Attenuation, Scatter, and Resolution Compensation Strategies for 99, Tc Myocardial Perfusion Imaging, ROC Evaluation of SPECT Compensation, The Journal of Nuclear Medicine, Nov. 2003, pp. 1725-1734, vol. 44, No. 11.

Obuchowski, et al., Multireader, Multicase, Receiver Operating Characteristic Analysis: An Empirical Comparison of Five Methods, Academic Radiology, Sep. 2004, pp. 980-995, vol. 11, No. 9.

Monnier-Cholley, et al., Detection of Lung Cancer on Radiographs: Receiver Operating Characteristic Analyses of Radiologists', Pulmonologists', and Anesthesiologists' Performance, Radiology, Dec. 2004, pp. 799-805, vol. 233, No. 3.

Tom Fawcett, An introduction of ROC analysis, Pattern Recognition Letters, Dec. 19, 2005, pp. 861-874, vol. 27.

Beam, et al., Correlation of Radiologist Rank as a Measure of Skill in Screening and Diagnostic Interpretation of Mammograms, Radiology, Feb. 2006, pp. 446-453, vol. 238, No. 2.

Chakraborty, ; Recent advances in observer performance methodology: jackknife free-response ROC (JAROC); 2005; Radiation Protection Dosimetry; 114(1-3)26-31.

Chakraborty, ; Jackknife free-response ROC methodology; 2004; Proc. SPIE; vol. 5372; pp. 144-153.

Goddard, C. C., et al.; Routine receiver operating characteristic analysis in mammography as a measure of radiologists' performance; 1998; The British Journal of Radiology; pp. 1012-1017.

Woods, K., et al.; Generating ROC Curves for Artificial Neural Networks; 1997; IEEE Trans. on Medical Imaging; 16 (3)329-337.

\* cited by examiner

RECEIVER OPERATING CHARACTERISTIC-BASED TRAINING

CROSS REFERENCE TO RELATED APPLICATIONS

This application claims the benefit of U.S. provisional application Ser. No. 60/969,705 filed Sep. 4, 2007, which is incorporated herein by reference.

The present application relates to training and data analysis in medicine, and particularly to the training of medical personnel in connection with the interpretation of medical image and other information. It also finds application to industrial, commercial, business, and other fields that require the analysis and/or interpretation of information.

Imaging modalities such as x-ray, computed tomography (CT), magnetic resonance imaging (MRI), positron emission technology (PET), single photon emission computed tomography (SPECT), ultrasound (US), and hybrid modality systems such as PET/CT and PET/MRI systems can provide valuable information about the structure and/or function of an object under examination. In medical applications, information derived from these and other examination modalities is routinely used to diagnose and treat diseases such as cardiovascular disease, neurological disease, orthopedic disease, and cancer, to name a few.

Of course, the proper interpretation of the information provided by these systems can lead to a more accurate diagnosis and hence a more appropriate treatment. Thus, the assessment of imaging data is one component of the training provided to resident radiologists. Attending physicians and other experienced medical professionals can also benefit from such training, for example in connection with new examination protocols or to reinforce previous training.

At the same time, not all imaging techniques have equal diagnostic utility. One way to evaluate the performance of medical procedures that combine human observers and technology is through the use of receiver operating characteristic (ROC) analysis. ROC methods, including localization ROC (LROC), free-response ROC (FROC), jackknife FROC (JAFFROC), alternative FROC (AFROC) methods have been used to compare different reconstruction techniques in SPECT and PET imaging, to evaluate a radiological computer aided detection (CAD) system, in connection with a neural network used in a computer aided differential diagnosis system, in mammography as a measure of radiologists' performance, to gauge pediatricians' ability to sort patients expected to have chest x-rays that are negative for pneumonia from those expected to have positive x-rays, and compare and quantify the performance of clinicians in the detection of missed lung cancer. See Narayanan, et al., *Human Observer Receiver-Operating Characteristic Evaluation of Attenuation, Scatter, and Resolution Compensation Strategies for $^{99m}Tc$ Myocardial Perfusion Imaging*, J. Nucl. Med. 2003; 44:1725-1734; Llacer, et al., *Results of a Clinical Receiver Operating Characteristic Study Comparing Filtered Back Projection and Maximum Likelihood Estimator Images in FDG PET Studies*, J. Nucl. Med. Vol. 34 No. 7 (1993); Farquhar, et al., *ROC and Localization ROC Analyses of Lesion Detection in Whole-Body FDG PET: Effects of Acquisition Mode, Attenuation Correction and Reconstruction Algorithm*, J. Nucl. Med. 1999; 40:2043-2052 (1999); U.S. Pat. No. 6,058,322 to Nishikawa et al. and entitled Methods for Improving the Accuracy in Differential Diagnosis on Radiologic Examinations; U.S. Pat. No. 5,622,171 to Asada et al entitled Method and System for Differential Diagnosis Based on Clinical and Radiological Information Using Artificial Neural Networks; Goddard, et al., *Routine Receiver Operating Characteristic Analysis in Mammography as a Measure of Radiologists' Performance*, British Journal of Radiology, October 1998 pp. 1012-1017; Berwick, et al., *Receiver Operating Characteristic Analysis of Diagnostic Skill*, Medical Care, Vol. 21, No. 9 (September 1983), pp-876-885. See also Obuchowski, et al., *Multireader, Multicase Receiver Operating Characteristic Analysis: An Empirical Comparison of Five Methods*, Acad. Radiol. 2004; 11:980-995; Monnier-Cholley, et al., *Detection of Lung Cancer on Radiographs: Receiver Operating Characteristic Analyses of Radiologists', Pulmonologists', and Anesthesiologists' Performance*, Radiology 2004; 233:799-805 (2004). See also Chakraborty, *Recent advances in observer performance methodology: jackknife free-response ROC (JAROC)*, Radiation Protection Dosimetry, 2005 114(1-3): 26-31 (2005); Chakraborty, et al., *Jackknife free-response ROC methodology*, Proceeding of the SPIE, Vol. 5372, pp. 144-153 (2004).

Aspects of the present application address these matters and others.

In accordance with one aspect, a training apparatus presents information to a human trainee for assessment and uses a receiver operating characteristic analysis to evaluate the trainee's assessment of the presented information.

According to another aspect, a computer readable storage medium includes instructions which, when executed by a computer, cause the computer to carry out a method. The method includes receiving a human user's assessment of information presented to the user and performing a receiver operating characteristic analysis of the received assessment to evaluate a performance of the human user.

According to another aspect, a method includes presenting information to a human user via the user interface of a computer, receiving the user's assessment of the information via the user interface of the computer, repeating the steps of presenting and receiving, determining a sensitivity and a specificity of the received assessments, using the determined sensitivity and specificity to assess a performance of the user, and presenting a result of the assessment to the user via the user interface of the computer.

According to another aspect, a computer readable storage medium includes a first plurality of records. Each record includes an evaluatee identifier, the evaluatee's assessment of information presented to the evaluatee, a result of a receiver operating characteristic analysis of the evaluatee's assessment of the information.

According to another aspect, a computer readable storage medium includes instructions which, when executed by a computer, cause the computer to carry out a method. The method includes presenting first and second information to a user for assessment. The first information includes information from a first study type and the second information includes information from a second study type that is different than the first study type. The method also includes determining a sensitivity of the user's assessment of the first information, determining a sensitivity of the user's assessment of the second information, and using the determined sensitivities to evaluate the user's assessment of the first information in relation to the user's assessment of the second information.

Still further aspects of the present invention will be appreciated by those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 2:
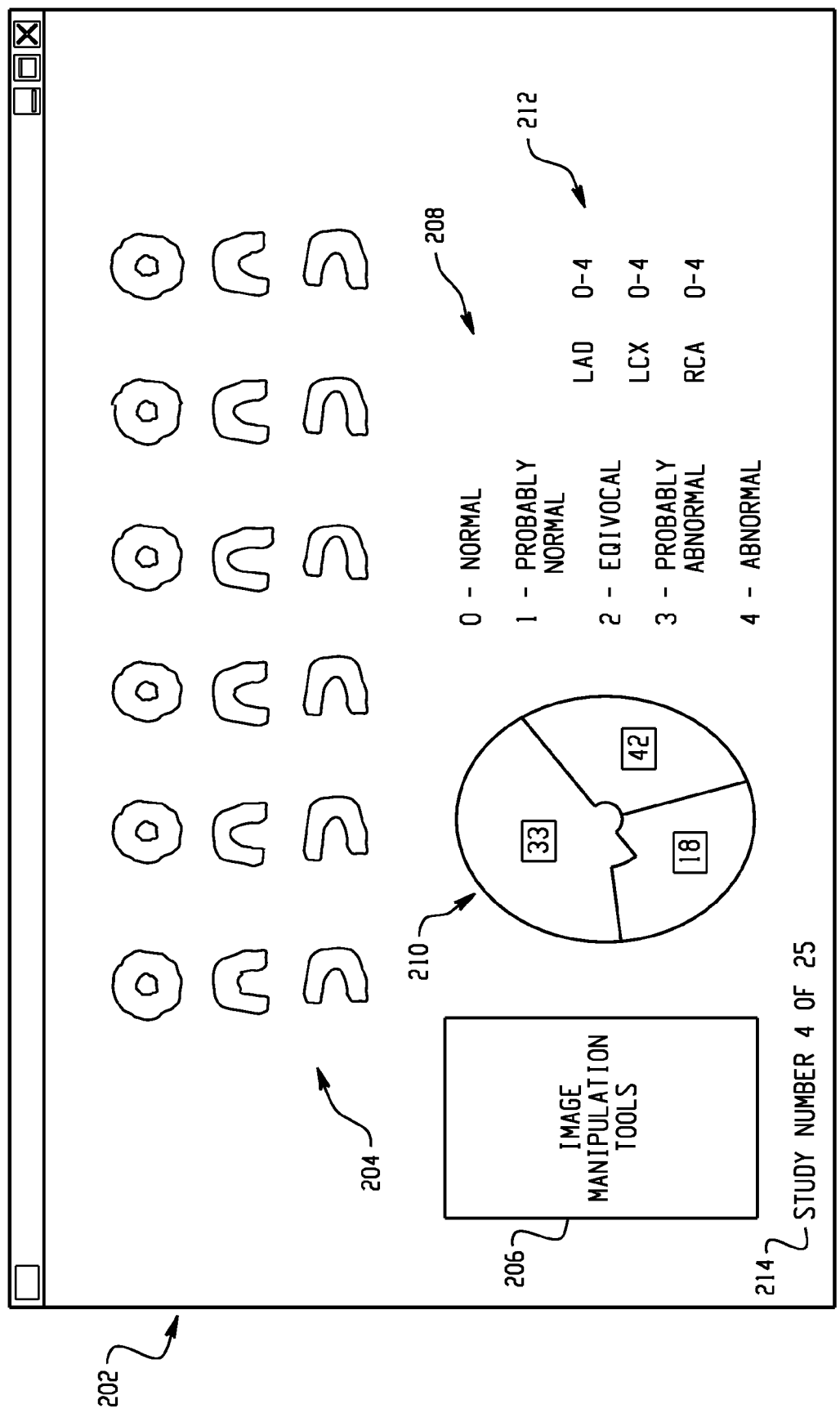
Figure 3:
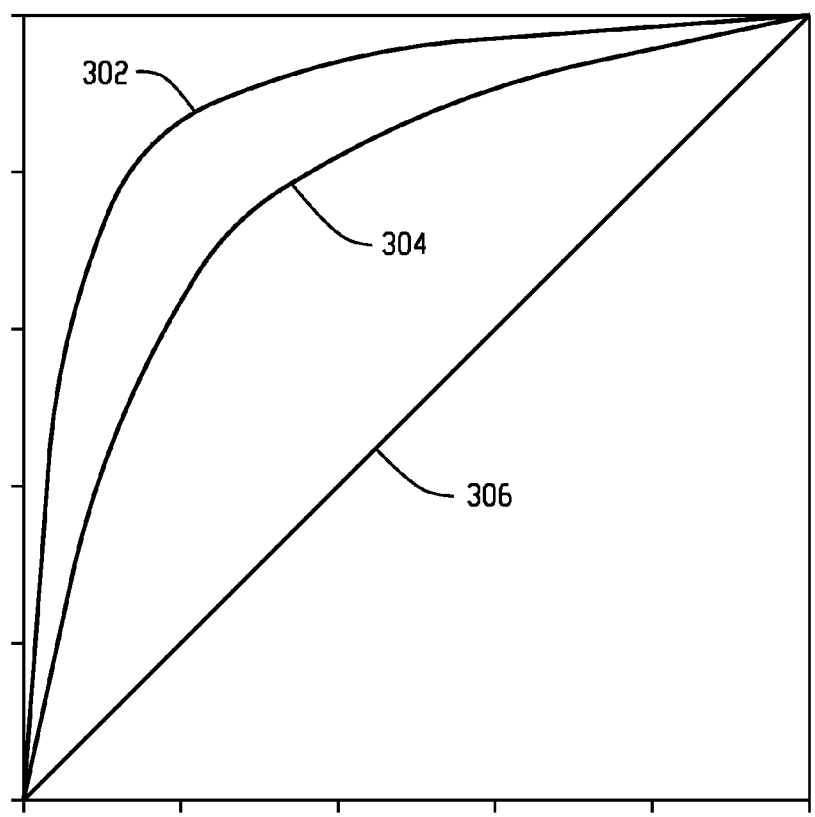
Figure 4:
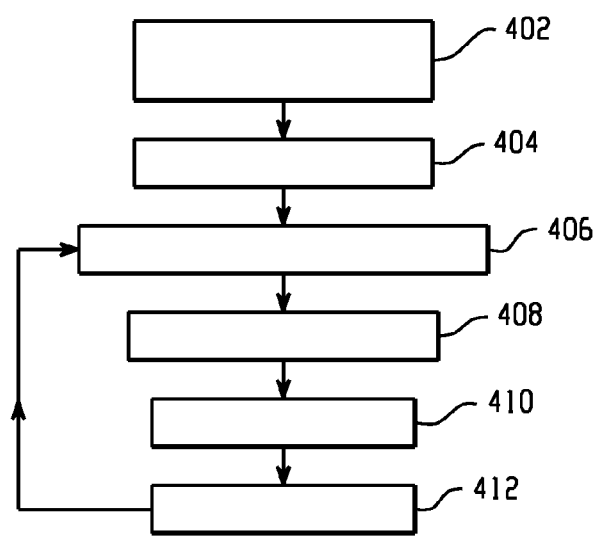

FIG. 1 depicts a system.
FIG. 2 depicts information provided to a user.
FIG. 3 depicts aspects of an ROC analysis.
FIG. 4 depicts a method.

With reference to FIG. 1, a system 100 includes one or more data sources 102$_{1-N}$ and a data repository 104 such as a computer readable storage medium.

The data sources 102 provide information that requires assessment and/or analysis by a human user. The information is presented to a human user via a user interface 103, the nature of which depends on the data source 102 and the information presented. The user interface 103 may be local to a data source 102, or as illustrated in FIG. 1, in data communication with the data source via a communication network 105 such as the Internet, a local or wide area network, or the like.

For the purposes of the present discussion, it will be assumed that the data sources 102 include medical imaging scanners that provide image and/or other information that is used to assess a disease state or other characteristics of human subjects. In such an implementation, the user interface 103 typically includes a computer-based workstation(s) that allows a user to initiate scans, select examination protocols, and otherwise interact with the scanner. One or more application software programs resident on the workstation or otherwise in data communication with the scanner allow radiologists or other medical professionals to access and/or manipulate scan data via a suitable graphical user interface (GUI). The application software is generally specific to the imaging modality, the examination protocol, and other application specific factors. It will be understood that the data may be ported or otherwise communicated to the operator interface, which may be remote or otherwise separate from the scanner.

While the present discussion focuses on medical imaging equipment and the assessment of medical conditions, other data sources 102 and applications are also contemplated. Non-limiting examples include imaging equipment for use in industrial and other applications, medical and other material analyzers (e.g., blood, tissue, or chemical analysis equipment), object or patient monitors (e.g., electrocardiograms, temperature, or vibration monitors), commercial, industrial, financial, or behavioral systems, and human data sources (e.g., in the case of information discerned through human observation and provided via a suitable user interface).

Information from the various data source(s) 102 is stored in a data repository 104 such as a computer readable storage medium. The data repository 104 includes an information database 117 containing a plurality of records 106$_{1-M}$. Each record 106 includes information to be assessed 108 by a trainee or other user, as well as an existing baseline assessment 110 of the information 108. Note that the information to be assessed 108 may include data from different types of data sources 102 (e.g., where image data and laboratory analysis results are relevant to an assessment).

The baseline assessment 110, which includes one or more baseline assessments of the data such as finding(s) of normal or abnormal, location(s) of abnormalities, or the like, serves as a ground truth or known state. The baseline assessment 110 is preferably obtained through a technique that is deemed to be relatively reliable, such as an expert assessment of the information 108, a known gold-standard examination protocol, or the like. It will again be understood that the nature of the information 108 and the assessment 110 are typically application dependent. Note also that the assessment may be performed before, during, or after the inclusion of the data 108 in the database.

Again in the example of medical image data, each record 106 may include data 108 from a scan of a particular patient or subject and a baseline assessment 110 of the data 108 as performed by a skilled radiologist. As another example, the baseline assessment 110 may be obtained or augmented using results from other data source(s) 102. Where the assessment 110 relates to the use of nuclear medicine image data to assess coronary artery disease (CAD), for example, the assessment 110 may be based at least in part on the results of a known gold-standard test such as a cardiac catheterization.

A data manipulator 112, such as computer software or firmware program stored in a computer readable medium and executed on a suitable computer, may also be provided to allow a trainer or other administrator to introduce known features in, remove features from, or otherwise manipulate the information 108. The data manipulator 112 may also allow the synthesis of information 108. Such implementations are particularly attractive in situations where obtaining reliable data can be difficult, expensive, or otherwise problematic.

In the example of image data, the data manipulator 114 may allow an expert to manipulate one or both of the projection data generated by the data sources 102 or the reconstructed image data so as to introduce known, simulated pathologies or other features in the data 108 of one or more records 106.

It should also be noted that the data sources 102 may be located at various physically dispersed locations. Hence, information from the data sources 102 may be communicated to the data repository 104 via a suitable communication network 114. The data repository 104 may also be integral to a data source 102, for example in an implementation where data is collected from only a single data source 102. The data repository 104 may also be located at various physically dispersed locations.

As will be described further below, the system 100 also includes a training or information presentation component 118, an ROC analyzer 120, a feedback component 126, and an evaluation database 124. The training component 118, which may be implemented via suitable computer software or firmware, presents information 108 from one or more records 106 in the data repository 104 to trainees or other users for assessment via a user interface such as a GUI. Again, the data presentation is ordinarily application specific. Preferably, however, the format in which the information 108 is presented mimics or is otherwise substantially identical to the format in which information is presented by the user interface 103 application software. Such an implementation tends to minimize time spent becoming familiar with the training component 118 and/or the particular data presentation, hence allowing users to focus on more substantive matters.

As illustrated in FIG. 1, the training component 118, ROC analyzer 120, and the feedback component 126 may be sub-components of application software 116 associated with the user interface 103. Such an implementation is particularly useful in situations in which it is desirable to train or otherwise familiarize users with a new application software or examination protocol. Note that, where the various components are remote from the data repository 104, the information may be communicated via a suitable communication interface 115.

The ROC analyzer 120, which may likewise be implemented via suitable computer software or firmware, performs receiver operating characteristic analyses of the assessments received by the training component 118 or otherwise obtained from the various users. The ROC analyses may be used to evaluate the individual performance of the various users, for example by evaluating the performance in relation to a performance benchmark.

The users' assessments of the presented data 108, together with a result of the ROC analysis, are stored in the evaluation database 124, which is located in the information repository 104 or other suitable storage. The evaluation database 124 includes a plurality of records $128_{1-P}$, with each record in the database including a user identifier 130, the user's assessments 132 of the presented information, and result(s) 134 of the ROC analysis. Benchmark data 150, such as an ROC analysis of the performance of the users' peers, the performance of one or more expert assessors, one or more threshold or grade values, or the like may also be stored in the data repository, hard coded as part of the ROC analyzer 120, or otherwise.

In cases where it may be useful to compare the performance of various users, the ROC analysis results 134 from various users may also be aggregated and/or stored based on user demographic or other characteristics. Particularly in applications in which one goal is to familiarize a user with the assessment of information obtained via different examination protocols, the ROC analysis results 134 for each user may include an analysis of the user's performance for each examination protocol. The ROC analysis results 134 may also include a time or date at which the assessment was performed, for example to allow a change in a particular user's (or indeed a population of users') performance to be evaluated over time.

The feedback component 126 provides feedback to the various users, preferably on an individual basis. In one implementation, the ROC analysis results 134 for the user are presented in relation those of the benchmark data 150. The ROC analysis results 134 for the user may also be presented as a function of time. The feedback component 126 may also identify those records or studies 106 in which the user's assessment 132 was different from that of the baseline assessment 110. To further enhance the learning experience, the data 108 from the identified studies 106 may be re-presented to the user for re-assessment. Alternatively or additionally, the user's assessment and the baseline assessment 110 may be presented.

An example of information presented by the training component 118 will now be described with reference to FIG. 2 in the case of data from a myocardial perfusion SPECT study to be assessed to determine the presence or absence of coronary artery disease (CAD). As illustrated, a GUI window 202 includes study information 204, image manipulation tools 206, and user assessment tools 208. In the example case of a myocardial perfusion SPECT study, the study information 204 would typically include image data such as one or more short axis, horizontal long axis, and vertical long axis views of the subject in the stress and/or rest conditions, as well as a polar map 210. Image manipulation tools 206 allow the user to view additional images, study certain of the image(s) in greater detail, vary display settings, and the like.

The assessment tools 208 receive the user's assessment of the presented data. In one example, the user assesses the study on a discrete five (5) point scale that represents a probability of the presence or absence of CAD. Thus, as illustrated at 212, the user may select from assessments that include normal, probably normal, equivocal, probably abnormal, and abnormal. The scale may also include fewer than five points, although three (3) or more points are preferred. The user may also be afforded the opportunity to assess the probability on a substantially continuous basis, for example by manipulating a slider or entering a numerical probability. Also as illustrated, the polar map 210 includes buttons that allow the user to enter an assessment of the left anterior descending artery (LAD), right coronary artery (RCA), and left circumflex artery (LCx) as a numerical value between 0 and 100 to represent a probability between 0 and 1.

While FIG. 2 represents the information presented in connection with an example study, it will be understood that a number of such studies are ordinarily presented in succession as indicated generally at 214. It will also be understood that the selection and format of the data presented and the assessments to be received from the user are ordinarily application specific.

In some situations, it may also be desirable to assess the user's performance when presented with two or more types of data, presentation formats, or the like. By way of example, the user may be presented with a first plurality of studies analogous to those described above in relation to FIG. 2, a second plurality of studies presented in a second newly developed or alternative presentation format, and a third plurality of studies presented in a third newly developed or alternative presentation format. Note that the various study types may be presented in sequence (i.e., a plurality of studies of the first type, followed by a plurality of studies of the second type, and so on), in an interleaved fashion (i.e., a study of the first type, a study of the second type, a study of the third type, a study of the first type, and so on), randomly, or other desired order. Particularly where the data is presented in different formats, the underlying data may be the same.

The user's performance may be assessed separately for each study type (e.g., a first assessment for the first study type, a second assessment for the second study type, and so on), for various combinations of the study types (e.g., a first assessment that represents user's performance for the first study type and a second assessment that represents the user's aggregate performance for the second and third study types), and/or for all study types in the aggregate. Feedback may be presented so as to provide the user with an indication of his or her relative performance on the various study types. For example, the user's performance on the second and third study types (either alone or in the aggregate) may be compared to and presented relative to the user's performance on the first study type, the user's aggregate performance across the various study types, or the like. The feedback may also be presented in relation to expert users, peers, or a known ground state.

In one example, the foregoing implementation is used to train or otherwise familiarize the user with the assessment of data from a new or different data source 102, a data set that includes different or supplemental data, a new data presentation format, or other variations. For example, the first study type may include a type of study with which user is familiar, while additional study type(s) may be newly developed or otherwise relatively unfamiliar to the user. The user's own performance relative to the first study type may thus serve as the benchmark data 150 against which the user's performance on the additional study type(s) is evaluated. Training may continue until, or the user may be provided with feedback when, it is determined that the user's performance on the second study type meets or exceeds the user's performance on the first study type, for example when the user's AUC score for the new study type exceeds the user's performance for the first study type.

Various examples of additional study type(s) are contemplated. In the medical field, for example, the additional study type(s) may include data from new or different data sources (e.g., in the case of a spectral CT scanner relative to a baseline non-spectral CT examination), data from a data source 102 having a different or improved performance characteristic (e.g., a time of flight PET scanner having an improved temporal resolution, or an examination apparatus having a different or improved spatial resolution, energy resolution or accuracy relative to an exiting apparatus), a new or different types of studies or study protocols (e.g., in the case of a newly developed myocardial infarction protocol relative to a previous protocol), the inclusion of new or additional information (e.g., the inclusion of multi-modality data, energy or material composition information from a spectral CT examination, functional data, data from a laboratory or other examination), and the like.

As another example, the first and second study types may include information generated by data sources manufactured by different vendors. Again in the context of a medical imaging, the first data source may include a PET scanner (or an application package or other component of a PET scanner) manufactured by vendor A while the second data source may include a PET scanner (or an application package or other comparable component of a PET scanner) manufactured by vendor B. As another example, the first and second data sources may include information generated by different versions or models of data sources manufactured by the same vendor. For example, the first data source may include version 1.0 of a cardiac imaging application software package manufactured by vendor A, while the second data source may include version 1.1 of the application software manufactured by vendor A. As another example, the first data source may include a first model of CT scanner manufactured by vendor A and having a first gantry rotation speed and number of slices, while the second data source may include a second model of CT scanner having a different gantry rotation speed and number of slices.

Note that the training and/or evaluation may also be provided in various contexts. For example, training may be provided in the course of a manufacturer sponsored applications training course, for example in connection with the introduction of a new system, application software package, or the like. As another example, a training package may be included as a component of a desired system or application package. Training may also be provided over the internet or otherwise on a standalone basis.

An example of an ROC analysis methodology will now be described in relation to FIG. 3. By convention, an ROC curve is plotted with a sensitivity on the ordinate or y-axis and (1−specificity) on the abscissa or x-axis. The sensitivity represents the likelihood that a positive assessment (e.g., an assessment indicating the presence of an abnormality) of the presented information corresponds to a true positive and is sometimes referred to as a true positive fraction. The specificity represents the probability that a negative assessment (e.g., an assessment indicating the absence of an abnormality) corresponds to a true negative and is sometimes referred to as a true negative fraction. The (1−specificity) is sometimes referred to as the false positive fraction.

The ROC curves can be used to evaluate the users' performance. When plotted according to the convention of FIG. 3, the ROC curve of a more accurate assessor will lie closer to the top left corner of the plot. FIG. 3 depicts three example curves: the first curve 302 depicts the performance of a relatively accurate assessor, a second curve 304 depicts the performance of an intermediate assessor, and the third curve 306 depicts the performance of a relatively less skilled assessor. As will be appreciated, the curve 306 depicts the performance of an assessor whose assessment accuracy is essentially random.

The ROC curves can be used in various ways. According to an area under the curve (AUC) assessment technique, the area under some or all of the curve is calculated for each user. When calculated according to the convention of FIG. 3, a relatively more skilled user will have a relatively higher AUC score than will a relatively less skilled user, and vice versa. According to another technique, a user's performance may be evaluated at one or more points on the curve (e.g., by evaluating a false positive fraction at one or more true positive fraction and/or by evaluating a true positive fraction at one or more false positive fractions). These and other suitable analysis techniques may also be implemented by those of ordinary skill in art.

Note also that various related ROC techniques may optionally be implemented by one of ordinary skill in the art to meet the needs of a particular application. In an LROC analysis, the user may be asked to provide a location and confidence rating or other assessment. In AFROC, the user may be asked to provide a location and confidence rating for a number of signals. In FROC, the user may be permitted to report more than one pathology or other feature in a given study, with the location information being used to improve the measurement. Another example includes the JAFROC method, which includes elements of FROC and the Dorfman-Bernaum-Metz (DBM) ROC methods.

Operation will now be described with reference to FIG. 4.

At 402, information is acquired from one or more data sources 102. Note that the information may be manipulated as desired to simulate abnormalities or other features. Some or all of the information may also be synthesized.

At 404, the information is stored in a suitable repository 104.

At 406, some or all of the stored information is presented to a first user for assessment. By way of example, the stored information may include information from Q (e.g., 100) scans or studies. Accordingly, information from an initial number R<Q (e.g., 10) studies may be presented to the user in succession. The user is invited to assess each study and is provided with immediate feedback as to the accuracy of the assessment of each study. Such an implementation can be used to familiarize the user with the operation of the system and/or to train the user on the assessment process.

Following the presentation of the first set, additional studies are provided until a termination condition such as a number of studies, an elapsed time, or the like has been satisfied. For example, the additional studies may be presented in succession until an additional number RP≤P−Q (e.g., 90) of studies has been presented to the user for assessment. In one implementation, the feedback is withheld until the user has completed his or her assessments of the additional studies or the termination condition has otherwise been satisfied. Note that the studies presented and the order of their presentation may be selected on a random or other desired basis. Moreover, the information may be presented over one or more temporally separated presentation sessions.

The user's performance is evaluated at 408. A result of the evaluation may be stored as desired.

The user is provided with feedback at 410. The feedback may include, for example, a pass/fail or other grade, the user's ROC curve, AUC score, or other desired feedback. The feedback may include a presentation of the user's scores over time to demonstrate an improvement (or fall off) in the user's performance. The feedback may be presented in relation to curve(s) of peers or expert assessors, on an absolute basis, or otherwise. The user may also be afforded the opportunity to revisit those studies in which the user's assessment was determined to be at least partially incorrect. As the evaluation and feedback steps is ordinarily completed and/or performed via computer upon the satisfaction of the termination condition, the delay is providing the feedback is ordinarily negligible from the standpoint of a human user. Hence, the user is provided with substantially immediate feedback.

At 412, the process is repeated as desired for additional users and/or for a given user. Note that the presentation of the information to the various users may be temporally interleaved, particularly where one or more of the users reviews the information in two or more presentation sessions.

Note that, while the above discussion has focused on an example that includes the use of medical image data to assess cardiovascular disease, the application of medical image data to other fields such as oncology, neurology, and orthopedics is also contemplated. Also contemplated are applications involving non-destructive testing of objects, defense and security applications, commercial and financial analysis, and the like. It will also be understood that the techniques are not limited to diagnosis and/or the recognition of features in the presented data and may also be used for other purposes. For example, training may include training on the proper manipulation of data. Thus, the user may be presented with desired data or data sets and afforded the opportunity to manipulate the data. In the case of image data, for example, the manipulation may include a segmentation operation in which the user is afforded the opportunity to segment the image into one or more regions or materials of interest. The user's performance may then be evaluated relative to a baseline manipulation of the data, for example as performed by an expert user. Note that other manipulation operation(s) such as calculation, sorting, or the like may also be provided, again depending on the nature of the data.

Note that the above-described techniques may also be used to evaluate the performance of both human and non-human evaluatees.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A system, comprising:
   one or more imaging scanners configured to provide information indicative of a disease state of a subject, wherein the one or more imaging scanners correspond to at least two different imaging modality types;
   a data repository configured to store the information from the one or more imaging scanners, the information including evaluation information;
   a training processor that presents the evaluation information of the at least two different imaging modality types from the data repository through a graphical user interface;
   an ROC processor that receives a signal indicative of an assessment by a trainee of the presented evaluation information and that performs a receiver operating characteristic analysis on the assessment to evaluate the assessment in relation to benchmark information; and
   a feedback processor that visually presents an aggregated result of the evaluation of the assessment of the information of the at least two different imaging modality types as a function of time and in relation to the benchmark data.

2. The system of claim 1 wherein the aggregated result includes the receiver operating characteristic analysis of the at least two different imaging modality types.

3. The system of claim 2 further comprising: a user interface configured to present the evaluation information and the aggregated result.

4. The system of claim 1 wherein the ROC processor evaluates the assessment of the presented information in relation to a baseline assessment of the presented information, identifies a subset of the evaluation information in which the assessment is different from the baseline assessment, and represents only the identified subset of the information.

5. The system of claim 4 wherein the baseline assessment includes an expert assessor's assessment of the presented information.

6. The system of claim 1 wherein the presented information includes a medical image.

7. The system of claim 1 wherein the presented information includes an image and the assessment includes a spatial location of a feature of the image.

8. The system of claim 1 wherein the presented information includes a simulated abnormality.

9. The system of claim 1 wherein the apparatus forms a part of a medical examination apparatus.

10. The system of claim 1 wherein the analysis includes an area under a curve analysis.

11. The system of claim 1 including a computer readable storage medium that contains information for presentation to the trainee and a baseline assessment of the contained information.

12. The system of claim 1 including:
   an evaluation database that stores a result of the evaluation for each of a plurality of trainees.

13. A non-transitory computer readable storage medium including instructions which, when executed by a computer, cause the computer to carry out a method that includes:
   receiving a user's assessment of information of at least two different imaging modality types presented to the user;
   performing a receiver operating characteristic analysis of the received assessment to evaluate a performance of the user; and
   presenting an aggregated result of the evaluation of the received assessment of the information of the at least two different imaging modality types as a function of time and in relation to benchmark data.

14. The computer readable storage medium of claim 13 wherein the method includes:
   presenting first information to the user for assessment, wherein the first information is of a first imaging modality type;
   comparing the user's assessment of the first information and a baseline assessment generated prior to the presentation of the first information;
   presenting a result of the comparison to the user.

15. The computer readable storage medium of claim 14 wherein the method includes presenting second information to the user, wherein the second information is of a second imaging modality type that differs from the first imaging modality type, wherein the step of presenting second information is performed after the step of presenting a result and the step of performing a receiver operating characteristic analysis includes performing a receiver operating characteristic analysis of the received assessment of the second information.

16. The computer readable storage medium of claim 13 wherein the method includes comparing the receiver operating characteristic analysis of the received assessment to benchmark data, and presenting selected information to the user for re-assessment based on the comparison to the benchmark data.

17. The computer readable storage medium of claim 13 wherein the step of performing a receiver operating characteristic analysis includes determining a sensitivity and a specificity.

18. A method comprising:
   acquiring information generated by at least two different imaging modality types;
   presenting the information to a user via a user interface of a computer;
   receiving an assessment of each type of information via the user interface of the computer;
   repeating the steps of presenting and receiving;
   determining a sensitivity and a specificity of the received assessments;
   using the determined sensitivity and specificity to assess a performance of the user; and
   presenting an aggregated result of the assessments as a function of time and in relation to benchmark data to the user via the user interface of the computer, wherein the aggregated result is based on the sensitivity and the specificity of the received assessments of the information.

19. The method of claim 18 wherein repeating includes repeating the steps of presenting and receiving until a termination condition is satisfied and the method further includes performing the step of presenting a result after the satisfaction of the termination condition.

20. The method of claim 18 wherein using includes using the determined sensitivity and specificity to perform an area under the curve analysis.

* * * * *